Nov. 2, 1971   W. PLATZ   3,616,705

APPARATUS FOR ISOTOPE DIAGNOSIS

Filed May 15, 1969

INVENTOR:
W. Platz
By Richards & Geier
ATTORNEYS 3,616,705
APPARATUS FOR ISOTOPE DIAGNOSIS
Winfried Platz, Erlangen, Germany, assignor to Siemens
Aktiengesellschaft, Erlangen, Germany
Filed May 15, 1969, Ser. No. 824,955
Claims priority, application Germany, May 30, 1968,
P 17 64 397.9–33
Int. Cl. F16h 27/02
U.S. Cl. 74—89.22                                 2 Claims

ABSTRACT OF THE DISCLOSURE

In an apparatus for isotope diagnosis to determine the distribution of radioactive substances in a body by means of a radiation detector, drive means is provided for effecting linear scanning movement of the detector over an examination zone of the body. The drive means include a stepping motor which is resiliently mounted in the apparatus and the drive contains vibration damping elements.

BACKGROUND OF INVENTION (a) Field of invention

The present invention relates to an apparatus for isotope diagnosis to determine the distribution of radioactive substances in a body by means of a radiation detector, the apparatus including drive means for effecting linear scanning movements of the detector over an examination zone of the body.

(b) Description of the prior art

Apparatus of this kind is used in particular in investigations in which the extent etc. of a thyroid gland or other organs, is determined, and changes such as tumours, detected, by measurement of the relative accumulation of radioactive substances administered to the patient, in these parts of the body as compared with other tissue.

The detector of this kind of apparatus has hitherto been driven by conventional kind of of electric motors. However, such motors operate in a continuous manner so that some difficulty occurs in re-locating various points of importance found during the scanning operation, or in achieving synchronism between the scanning movement carried out by a second independent radiation detector and that carried out by a first detector. Consequently stepping motors have been used whereby the movement of the detector is divided into a large number of small individual steps which can be used by an electrical signal to control another stepping motor. However, it has been found to be a drawback in this context that the stepping motor produces undesired oscillations and noise signals in the equipment, because of its stepping mode of operation.

The main object of the present invention is to provide, in an apparatus for isotope diagnosis, drive means in which the aforesaid disadvantages are minimized or eliminated.

SUMMARY OF INVENTION

According to the present invention there is provided in an apparatus for isotope diagnosis to determine the distribution of radioactive substances in a body by means of a radiation detector, drive means for effecting linear scanning movements of the detector over an examination zone of said body, said drive means including a stepping motor which is resiliently mounted in the apparatus and a belt drive incorporating drive shafts carrying drive pulleys disposed between the motor and a driven element, the drive containing vibration-damping elements consisting of resilient connections between the drive pulleys and the drive shafts.

For the damping elements between the motor and its mountings, all known kinds of resilient damping elements may be used, for example soft-rubber mountings. The drive arrangements can be standardised for example by using friction damping elements and rubber spring means in the drive system. A friction damper can take the conventional form of a flywheel in which part of the mass is in engagement with the hub fixed to the driven shaft (for example, the motor output shaft) exclusively through a friction coupling, so that high-acceleration movements of the shaft can be compensated for by friction between the facings of the coupling. Effective rubber spring means can be arranged in the form of soft-rubber inserts disposed between the drive pulleys and the drive shafts. High-acceleration shock-loading or surge effects in the drive shaft can then be absorbed in the rubber.

BRIEF DESCRIPTION OF DRAWINGS

In order that the invention may be more fully understood an embodiment in accordance therewith will now be described by way of example with reference to the accompanying drawings, in which.

DESCRIPTION OF PREFERRED EMBODIMENT

Figure 1:
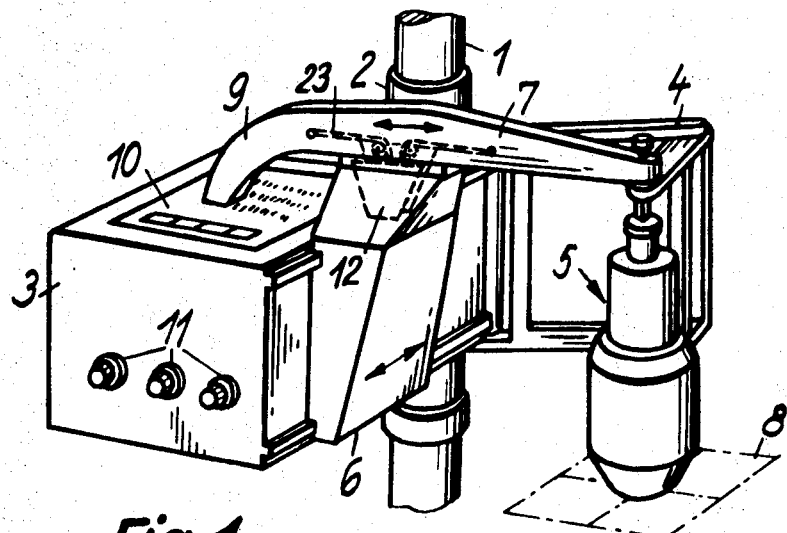
FIG. 1 is a perspective view of the essential part of an apparatus for isotope diagnosis.

Referring to FIG. 1, there is shown a housing 3 arranged to be vertically adjustable along a stand 1, the housing being secured to a sleeve 2. The housing 3 contains switching and drive means of the apparatus. The housing carries a double-articulated support member 4 for a radiation detector 5. The detector 5 comprises a radiation measuring device housed in a screened casing and defines a radiation entry aperture which receives radiation emitted from an examination zone 8. Drive means (FIG. 2) are provided for effecting scanning movement of the detector through a carriage 6 and the scanner arm 7 connected at one end to the detector 5. The detector 5 is caused to linearly scan the examination area 8, for example in the manner shown. At the other end of the scanner arm 7, a recording head 9 is arranged, which consists of a recorder mechanism for producing a record of the measurements obtained by the detector on recording material 10 carried by the housing 3. The elements used to adjust the speed of the scanning, as well as the ON/OFF switches, sensitivity selectors etc., have been indicated symbolically by knobs 11 on the front of the housing 3. A mounting 12 assembled in the carriage 6 provides the support for the drive means of the apparatus which are shown in more detail in FIG. 2.

Figure 2:
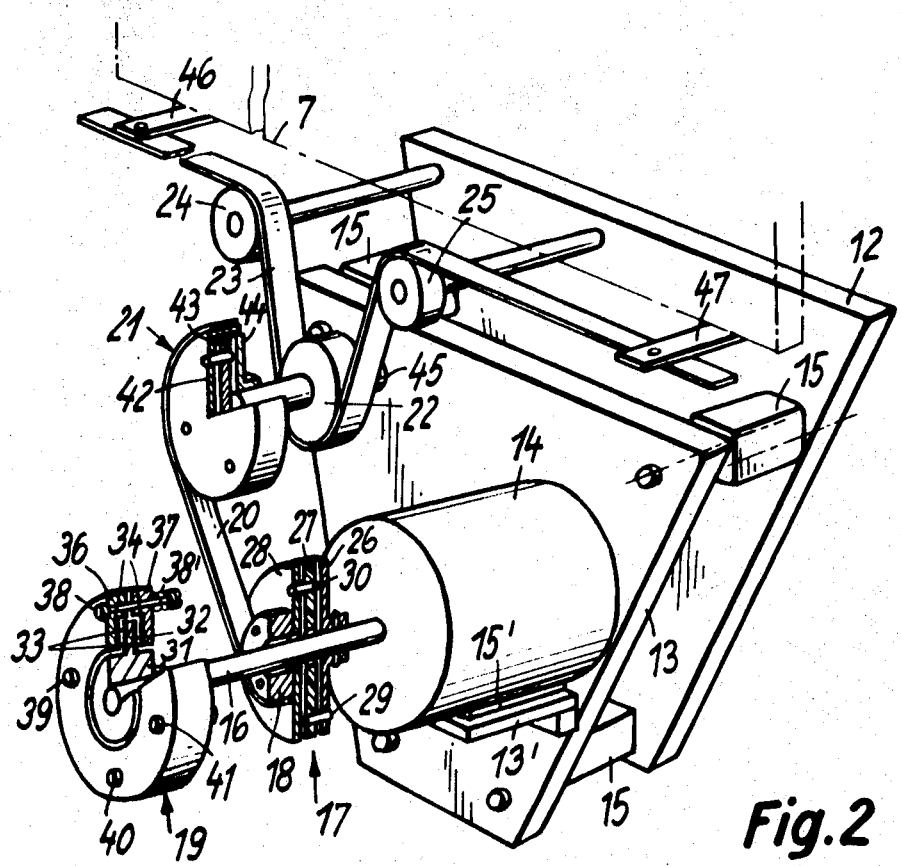
FIG. 2 is an enlarged view of the arrangement of the drive means of the apparatus of FIG. 1.

Referring to FIG. 2 the drive means include a stepping motor 14, fitted to a backing plate 13, which is resiliently fixed to the mounting 12 as by cushioning elements 15. The elements 15 function to damp or absorb any undesired oscillations or vibrations from the motor 14, and are preferably made of soft rubber. In this context, the respective fixings between mounting 12 and elements 15 and plate 13 and these same elements, are taken past one another without touching. In order to improve the shock-absorbing characteristics, a resilient mounting such as rubber buffer 15′ is also arranged between a mounting 13 on the plate 13, and the motor 14.

Consecutively arranged upon the output shaft 16 of the motor 14, are a shock-absorber 17, a drive pulley 18 and a friction damper 19. The drive pulley 18 is connected through a belt 20 to a pulley 21 which is designed as a damper and is itself fixed to a further pulley 22. The pulley 22 is connected through a belt 23 with the scanner arm 7. In order to provide a better engagement between the belt 23 and the pulley 22, the belt is given a larger angle of lap by passing it in a U-shaped loop around pulleys 24 and 25, which rotate about fixed shafts secured to the mounting 12.

The shock-absorber 17 comprises a disc 26 fixed to the motor output shaft 16 which disc is secured by three pins, only the pin 29 being visible in the drawing, to a disc 27 of a resilient material such as rubber which is loosely mounted on the output shaft 16. A disc 28 is secured by three other pins, only one pin 30 being visible, to the rubber disc 28. The disc 28 and the pulley 18 are loosely mounted on the shaft 16, with the pulley 18 rigidly connected to the disc 28.

At the free end of the shaft 16, the friction damper is mounted which may be in the form of a flywheel fitted to to the shaft 16, and consisting of a hub which is secured through resilient means to concentric rings of high mass. The damper 19 illustrated, comprises a hub 31 which carries a disc 32 in its central transverse plane. The latter is provided on its side faces with brake linings 33. Opposite the brake linings 3, there are disposed similar linings 34 mounted on rings 36 and 37 which are concentric with the hub 31. The rings 36 and 37 are urged into contact through their linings, with the disc 32, as by springs 38' carried by screws 38 to 41. Because of the inertia presented by the high mass of the damper 19 secured to the rings 36, 37, any surge torque from the motor 14 causes slight delay in the transmission of the drive because the said mass first of all has to be accelerated. Also, because of the spring-loading of the rings 36 and 37, the disc 32 slips slightly when the drive torque reaches its peak value. The disc 32 is then carried round a little, when the torque peak has passed, until the inertia of the damper 19 is braked. Thus, overall the damper 19 achieves at least partial compensation for any torque peaks. Alternatively, the friction damper 19 may be replaced by a pulley consisting of a hub and concentrically arranged rings of high mass resiliently connected to the hub.

The pulley 21, is similarly designed to the damper 17, but is integral with a brake 42, forming a unit, consisting of a resilient element constituted by a rubber disc 43 connected to a disc 44 which is fixed to a drive shaft 45. Thus, in the pulley 21 further damping of surge torque components coming from the stepping motor 14, takes place. The actual drive to the scanner arm 7 is then effected through the pulley 22 upon which the belt 23 runs, the latter being secured to the arm 7 at points 46 and 47. The elasticity of the belts 20 and 23 also contributes to damping of the shocks, i.e. to quiet running.

In the apparatus described, on the one hand the transmission of vibrations from the motor is inhibited and on the other hand the movements of the detector and also its direct drive elements are so synchronised by the damping elements that the detector is moved uniformly.

I claim:

1. In an apparatus for isotope diagnosis to determine the distribution of radio-active substances in a body, a radiation detector and drive means for effecting linear scanning movements of said detector over an examination zone of the body, said drive means comprising a driven member actuating said detector, a stepping motor, means resiliently supporting said stepping motor, and a belt drive comprising drive shafts, drive pulleys located between said motor and said driven member and loosely mounted upon said drive shafts, belts extending over said pulleys and vibration-damping elements between said pulleys and said drive shafts, each of said vibration-dampting elements comprising an annular member fast for rotation with a separate drive shaft, and a rubber disc connecting said annular member with the drive pulley mounted on that drive shaft, connections between the annular member and the rubber disc and between the drive pulley and the rubber disc being independent of each other.

2. In an apparatus for isotope diagnosis to determine the distribution of radio-active substances in a body, a radiation detector, and drive means for effecting linear scanning movements of said detector over an examination zone of the body, said drive means comprising a driven member actuating said detector, a stepping motor, means resiliently supporting said stepping motor, and a belt drive comprising drive shafts, drive pulleys located between said motor and said driven member and loosely mounted upon said drive shafts, belts extending over said pulleys and vibration-damping elements between said pulleys and said drive shafts, and a friction-type vibration damper mounted upon the motor shaft of said stepping motor and comprising a hub fast for rotation with said motor shaft, a disc carried by said hub in the central transverse plane of the hub, brake linings upon the side faces of said disc, rings surrounding said disc and spring means pending said rings into contact with said brake linings.

References Cited

UNITED STATES PATENTS

| | | | |
|---|---|---|---|
| 2,491,341 | 12/1949 | Tillman | 74—89.22 |
| 2,641,426 | 6/1953 | Rauscher | 248—22 |
| 2,762,661 | 9/1956 | Sloyan | 248—22 |
| 2,884,788 | 5/1959 | Clark | 74—89.22 |
| 3,040,899 | 6/1962 | Kron | 248—22 |
| 3,222,953 | 12/1965 | Benjamen | 74—574 |
| 3,388,604 | 6/1968 | McFarland et al. | 74—89.22 |
| 3,403,474 | 10/1968 | Spasoff | 74—89.22 |
| 2,572,265 | 10/1951 | Johnson | 64—27 |

FRED C. MATTERN, JR., Primary Examiner

W. S. RATLIFF, JR., Assistant Examiner